United States Patent
Glushchenko et al.

(10) Patent No.: US 9,059,496 B2
(45) Date of Patent: Jun. 16, 2015

(54) NANOPARTICLE-ENHANCED LIQUID CRYSTAL RADIO FREQUENCY PHASE SHIFTER

(75) Inventors: Anatoliy Volodymyrovych Glushchenko, Colorado Springs, CO (US); Zbigniew Jan Celinski, Colorado Springs, CO (US); Robert Edwin Camley, Colorado Springs, CO (US); John August Kosinski, Wall Township, NJ (US)

(73) Assignee: THE REGENTS OF THE UNIVERSITY OF COLORADO, Denver, CO (US)

( * ) Notice: Subject to any disclaimer, the term of this patent is extended or adjusted under 35 U.S.C. 154(b) by 428 days.

(21) Appl. No.: 13/296,181

(22) Filed: Nov. 14, 2011

(65) Prior Publication Data

US 2014/0022029 A1    Jan. 23, 2014

(51) Int. Cl.
*H01P 1/18*    (2006.01)
*B82Y 20/00*   (2011.01)
*B82Y 99/00*   (2011.01)

(52) U.S. Cl.
CPC ............... *H01P 1/18* (2013.01); *Y10S 977/773* (2013.01); *B82Y 99/00* (2013.01); *H01P 1/184* (2013.01); *B82Y 20/00* (2013.01)

(58) Field of Classification Search
CPC ............. H01P 1/184; H01P 1/18; H03H 7/00; H03H 7/18; H03H 7/20; H03H 2/00; H03H 1/00; Y10S 977/773; B82Y 99/00
USPC ........................................................ 333/161
See application file for complete search history.

(56) References Cited

U.S. PATENT DOCUMENTS

| | | | |
|---|---|---|---|
| 5,936,484 A | 8/1999 | Dolfi et al. | |
| 7,889,413 B1* | 2/2011 | Cook et al. | 359/245 |
| 2004/0095658 A1* | 5/2004 | Buretea et al. | 359/853 |

OTHER PUBLICATIONS

Smith et al., Elastic response of a nematic liquid crystal to an immersed nanowire, Jan. 3, 2007, Journal of Applied Physics, 101, pp. 014305-1 through 014305-9.*
R. Camley et al., "High-Frequency Signal Processing Using Magnetic Layered Structures", J. Magnetism and Magnetic Materials, vol. 321, pp. 2048-2054 (2009).
H. Atkuri et al., "Preparation of Ferroelectric Nanoparticles for their Use in Liquid Crystalline Colloids", J. Opt. A: Pure Appl. Opt., vol. 11, 024006 (2009).
M. Kaczmarek et al., Ferroelectric Nanoparticles in Low Refractive Index Liquid Crystals for Strong Electro-optic Response, Applied Physics Letters, vol. 92, 103307 (2008).
F. Li et al., "Orientational Coupling Amplification in Ferroelectric Nematic Colloids", Phys. Rev. Lett., vol. 97, p. 147801 (2006).
Y. Reznikov et al., "Ferroelectric Nematic Suspension", Applied Physics Letters, vol. 82, No. 12, p. 1917-1919 (2003).

(Continued)

Primary Examiner — Stephen E Jones
Assistant Examiner — Scott S Outten
(74) Attorney, Agent, or Firm — Kenyon & Kenyon LLP (57) ABSTRACT

A nanoparticle-enhanced liquid crystal phase shifter is provided including a first substrate layer, a plurality of electrodes attached to the substrate layer, a ground plane layer attached to a second substrate layer, and a liquid crystal layer between the ground plane layer and the first substrate layer, including a suspension of a liquid crystal material and highly polarizable nanoparticles having specific shape and size characteristics.

35 Claims, 2 Drawing Sheets

(56) References Cited

OTHER PUBLICATIONS

O. Buchnev et al., "New Non-Synthetic Method to Modify Properties of Liquid Crystals Using Micro- and Nano-Particles", Journal of the SID, vol. 13, No. 9, pp. 749-754 (2005).

A. Glushchenko et al., "Ferroelectric Particles in Liquid Crystals: Recent Frontiers", Molecular Crystals & Liquid Crystals, vol. 453, No. 1, pp. 227-237 (2006).

F. Li et al., "Ferroelectric Nanoparticle/Liquid-Crystal Colloids for Display Applications", Journal of the SID, vol. 14, No. 6, pp. 523-527 (2006).

G. Cook et al., "Nanoparticle Doped Organic-Inorganic Hybrid Photorefractives", Optics Express, vol. 16, No. 6, pp. 4015-4022 (2008).

A. Mikulko et al., "Complementary Studies of BaTiO3 Nanoparticles Suspended in a Ferroelectric Liquid-Crystalline Mixture", Europhysics Letters, vol. 87, pp. 27009-27012 (2009).

G. Cook et al., "Harvesting Single ferroelectric Domain Stressed Nanoparticles for Optical and Ferroic Applications", Journal of Applied Physics, vol. 108, 064309 (2010).

O. Kurochkin et al., "Nano-colloids of Sn2P2S6 in Nematic Liquid Crystal Pentyl-cianobiphenile", Condensed Matter Physics, vol. 13, No. 3, 33701 (2010).

\* cited by examiner

FIGURE 1

NANOPARTICLE-ENHANCED LIQUID CRYSTAL RADIO FREQUENCY PHASE SHIFTER

GOVERNMENT INTEREST

This invention was made with government support under grant number W911NF-04-1-0247 awarded by the U.S. Army Research Office. The government has certain rights in the invention.

FIELD OF THE INVENTION

The present invention relates generally to phased-array radio frequency (RF) systems and, more particularly, to an electronic phase shifter component that may be used in phased-array RF systems.

BACKGROUND OF THE INVENTION

Conventional phase shifters are often used in phased-array RF systems to provide controllable phase shift of RF signals. There are various types of phase shifters, including liquid crystal phase shifters. Prior developments in the field of liquid crystal phase shifters are disclosed in Dolfi et al. (U.S. Pat. No. 5,936,484), which is incorporated herein by reference in its entirety. Dolfi et al. discloses a conventional liquid crystal phase shifter that provides a tunable phase shift for use in a phased-array. The conventional phase shifter in Dolfi et al. is constructed in a microstrip configuration, in which the signal line is formed on an insulating substrate and a liquid crystal layer separates the signal line and a ground plane.

In the conventional liquid crystal phase shifter disclosed in Dolfi et al., an electric field (produced by the DC bias between the signal line and the ground plane) rotates the orientation of the liquid crystal molecules, creating a change in dielectric permittivity of the liquid crystal as seen by the propagating RF signal and, ultimately, a change in the propagation velocity of the RF signal along the phase shifter. Accordingly, the change in the propagation velocity appears as an electric phase shift for small RF device lengths. The amount of phase shift is proportional to the applied voltage and electric field. Accordingly, the amount of phase shift returns to its base value when the voltage is removed.

However, one of the disadvantages of conventional liquid crystal phase shifters is the limited amount of phase shift produced per applied voltage, typically on the order of half that of nanoparticle-enhanced liquid crystal phase shifters. In consequence, in order to produce a given amount of phase shift, conventional phase shifters require increased RF device size on the order of double that of similar nanoparticle-enhanced liquid crystal phase shifters.

SUMMARY OF THE INVENTION

The present invention resolves the aforementioned problems associated with the conventional liquid crystal phase shifters. In particular, the present disclosure provides an improved liquid crystal phase shifter that enhances the amount of phase shift produced per applied voltage as compared to the conventional art, thereby enabling higher performance (i.e., more phase shift) or a smaller device size for a desired amount of phase shift (i.e., more phase shift per unit device length), compared to the conventional art. Furthermore, the present disclosure exhibits superior RF circuit performance, including superior temperature stability, continuous or discrete phase shift tuning, minimal insertion loss, and excellent tuning speeds. Other advantages of the present disclosure over the conventional art include lower cost of performance, improved product reliability, lower power consumption (i.e., tuning voltage within supply voltage limits), and low toxicity associated with device components. Furthermore, the present nanoparticle-enhanced liquid crystal phase shifter is compatible with conventional on-chip module fabrication methods (such as a silicon or GaAs substrate) in a room temperature environment.

Given the aforementioned advantages, the present disclosure may be used in phased-array RF systems for communications, radar, etc. Moreover, the present disclosure may be applied to all analog RF circuits requiring a tunable amount of phase shift, including all commercial and military communications and radar systems and, particularly, systems with phased-array antennas. Indeed, the present nanoparticle-enhanced liquid crystal phase shifter may be applied to various technologies, including commercial microwave systems and RF systems, such as mobile phones (and other cellular network transceivers) and telecommunications infrastructure.

In one embodiment, the present nanoparticle-enhanced liquid crystal phase shifter may include at least one electrode attached to a first substrate layer, a ground plane layer attached to a second substrate layer, and a liquid crystal layer positioned between the ground plane layer and the first substrate layer. In this embodiment, the liquid crystal layer includes a suspension of a liquid crystal material and ferroelectric nanoparticles. The ferroelectric nanoparticles preferably have a permanent dipole moment value greater than a maximum value of an electric field induced polarization of the liquid crystal material without ferroelectric nanoparticles. Alternatively, the liquid crystal layer may include a suspension of a liquid crystal material and nanoparticles having a dielectric constant greater than the liquid crystal. In other embodiments, the liquid crystal layer includes a suspension of a liquid crystal material and ferromagnetic nanoparticles (having a nonzero permanent magnetization), ferrimagnetic nanoparticles (having a nonzero permanent magnetization), or multiferroic nanoparticles.

In another aspect of the present disclosure, the size ratio of a length of a longest axis of the nanoparticles to the length of the longest axis of the liquid crystals ranges from 1:10 to 1:100. In another embodiment, the shape anisotropy (i.e., the ratio of the length of the longest axis of the nanoparticles to the length of the shortest axis of the nanoparticles) is at least 10. In yet another embodiment, the concentration of the ferroelectric nanoparticles, ferromagnetic (or ferrimagnetic) nanoparticles, or multiferroic nanoparticles in the liquid crystal material may range from 0.1% by weight to 1.0% by weight; the concentration of the high dielectric constant nanoparticles in the liquid crystal material may range from 0.1% by weight to 10% by weight. In an alternative embodiment, the ferroelectric nanoparticles, ferromagnetic nanoparticles, ferrimagnetic nanoparticles, or the multiferroic nanoparticles may include a surfactant coating.

BRIEF DESCRIPTION OF THE DRAWINGS

The accompanying drawing, which is included to provide further understanding of the present disclosure, and is incorporated in and constitutes a part of the specification, illustrates preferred embodiments of the present disclosure, and together with the description serves to explain the principles of the present disclosure. The present disclosure will now be described further with reference to the accompanying drawing as follows.

DETAILED DESCRIPTION

Figure 1:
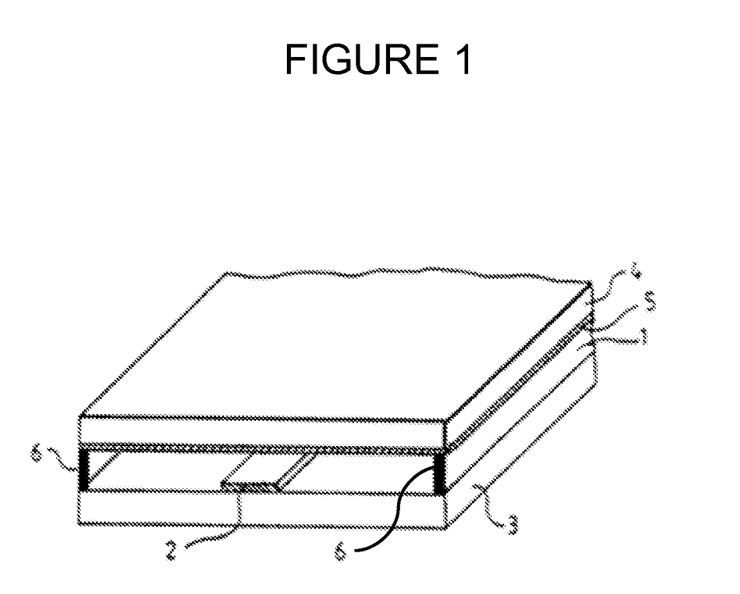
FIG. 1 is a perspective view of a conventional phase shifter containing an exemplary embodiment of the nanoparticle-enhanced liquid crystal according to the present invention.

FIG. 1 illustrates a conventional phase shifter containing an exemplary embodiment of a nanoparticle-enhanced liquid crystal according to the present invention. In this exemplary embodiment, a conventional "inverted microstrip" configuration is implemented with the present disclosure. Although salient features of the microstrip configuration are provided below, further details of a conventional "inverted microstrip" configuration are provided in Dolfi et al. (U.S. Pat. No. 5,936,484).

In FIG. 1, signal line (or electrode) 2 is deposited on a substrate 3, which is made of an insulating material having high permittivity $\in$. Suitable materials for signal 2 include, but are not limited to, metals, such as gold, copper, and silver. Furthermore, suitable materials for substrate 3 include, but are not limited to, silicon, magnesium oxide, alumina, GaAs, and glasses of various types.

Unlike the conventional phase shifter, the liquid crystal layer 1 between substrate signal line 2, substrate 3, and lid 4 contains a suspension of highly polarizable nanoparticles with specific characteristics, which are discussed in detail below. Lid 4 with an attached ground plane 5 is positioned over liquid crystal layer 1. Sidewalls 6 of the lid 4 confine liquid crystal layer 1 and maintain spacing. Suitable materials for lid 4 include, but are not limited to, glass, Si, GaAs, MgO, $Al_2O_3$ and sapphire. Suitable materials for ground plane 5 include, but are not limited to, metals, such as copper, silver, gold, etc. Suitable materials for sidewalls 6 include, but are not limited to, a glass frit, metallic gasket, or a combination of a glass frit and a metallic gasket, or a non-conductive glue (such as a UV-polymerizable epoxy or thermally polymerizable epoxy).

In addition, like in conventional phase shifters, a thin layer of polyimide may also cover substrate 3 and signal line 2 (as well as ground plane 5 and lid 4). This polyimide layer bonds and orients the liquid crystal molecules in liquid crystal layer 1. A means for applying a DC bias voltage between the signal line and the ground plane (e.g., conventional bias tees) is not explicitly shown or described herein, but it is described in the conventional art.

According to an exemplary embodiment of the present invention, the nanoparticle-enhanced liquid crystal phase shifter achieves approximately two times faster response time (i.e., the phase change in response to a change in the applied electric field), as compared to a conventional phase shifter with only liquid crystal in the phase shifter component. The nanoparticle-enhanced liquid crystal design also achieves a larger phase shift per unit length of the device, which results in either or both of smaller devices and devices that operate at lower voltage in achieving a given phase shift. These are two significant improvements in phase shifter designs, which were long desired and were previously not possible with conventional phase shifter designs.

More specifically, the nanoparticle-enhanced liquid crystal design achieves a phase shift per unit device length on the order of 30°/mm at an RF frequency of 60 GHz. In contrast, conventional liquid crystal phase shifters produce on the order of 8°/mm at an RF frequency of 60 GHz. Furthermore, an exemplary phase shifter according to the present disclosure operates at a voltage (for an amount of phase shift, ranging from 0 to 30°/mm at an RF frequency of 60 GHz) ranging from 0 to 10 V, compared to 0 to 8°/mm at an RF frequency of 60 GHz observed in conventional liquid crystal phase shifters (requiring 0-20 V). Another advantage of the nanoparticle-enhanced liquid crystal design is that the tuning voltage of the nanoparticle-enhanced liquid crystal design is within supply voltage limits for common 12 V DC systems, and DC or AC may be used to drive tuning. Furthermore, the present nanoparticle-enhanced liquid crystal phase shifter maintains the superior group delay behavior exhibited by conventional liquid crystal phase shifters.

The nanoparticles according to the present invention are highly polarizable nanoparticles. "Highly polarizable nanoparticles" include ferroelectric materials with a permanent dipole moment; high dielectric constant materials with a high dielectric constant (K) greater than 15 (as compared to the common electronic materials, such as $SiO_2$ that has a dielectric constant of approximately 11 and GaAs that has a dielectric constant of approximately 12-13); ferromagnetic materials or ferrimagnetic materials with a permanent magnetization; and multiferroic materials with more than one primary ferroic order parameter (i.e., ferromagnetism, ferroelectricity, ferroelasticity, and ferrotoroidicity) simultaneously (i.e. in a single phase). It has been discovered that the nanoparticles must retain the "highly polarizable" characteristics of the materials from which the nanoparticles are made, i.e., ferroelectric, high dielectric constant, ferromagnetic or ferrimagnetic, or multiferroic characteristics. Examples of ferroelectric materials, high dielectric constant materials, ferromagnetic materials, ferrimagnetic materials, and multiferroic materials are provided below.

Suitable ferroelectric materials include, but are not limited to, perovskites, tungsten bronzes, bismuth oxide layered materials, pyrochlores, alums, Rochelle salts, dihydrogen phosphates, dihydrogen arsenates, guanidine aluminum sulfate hexahydrate, triglycine sulfate, tin hypothiodiphosphate ($Sn_2P_2S_6$ or SPS), colemanite, and thiourea. Exemplary perovskites include, but are not limited to, barium strontium titanate (BST), barium titanate ($BaTiO_3$ or BT), $Pb(Co_{0.25}Mn_{0.25}W_{0.5})O_3$, as well as barium titanate and lead titanate doped with niobium oxide, antimony oxide, lithium niobate ($LiNbO_3$), lithium tantalate ($LiTaO_3$), and lanthanum oxide. Suitable ferroelectric materials also include titanates and tantalates, such as lead lanthanum zirconium titanate (PLZT), strontium bismuth tantalate (SET), lead zirconium titanate, and strontium bismuth tantalate (SBT).

Suitable high dielectric constant materials (or high-K materials) are materials with a dielectric constant higher than silicon oxide. Including, but not limited to, bismuth strontium titanate (BST), barium titanate (BT), strontium titanate (ST), lead zirconium titanate (PZT), magnesium and calcium titanates ($Mg_2TiO_4$, $MgTiO_3$ and $CaTiO_3$) and their composites, hafnium silicate, zirconium silicate, hafnium dioxide, tantalum dioxide, tantalum pentoxide, aluminum oxide, and zirconium dioxide.

Suitable ferromagnetic materials include, but are not limited to, cobalt, nickel, gadolinium, gallium manganese arsenide, iron and iron-containing magnetic metal oxides. Non-limiting examples of iron-containing metal oxides include FeO, $\gamma$-$Fe_2O_3$ (maghemite), and $Fe_3O_4$ (magnetite). Ferromagnetic nanoparticles can also be a mixed metal oxide of the type $M1_x$-$M2_yO_4$, wherein M1 represents a divalent metal ion and M2 represents a trivalent metal ion. For example, ferromagnetic nanoparticles may be magnetic ferrites of the formula $M1Fe_2O_4$, wherein M1 represents a divalent ion selected from Mn, Co, Ni, Cu, Zn, or Ba, pure or in admixture with each other or in admixture with ferrous ions. Furthermore, suitable ferromagnetic materials may also include hexagonal ferrites and garnets (e.g., $BaFe_{12}O_{19}$ or $Y_3Fe_5O_{12}$). Suitable ferrimagnetic materials include, but are not limited to, rare earth transition metals, ferrites, garnets, gadolinium, terbium, and dysprosium with at least one of Fe and Co, and combinations thereof. Exemplary ferrimagnetic materials also include iron ferrites, such as $CoFe_2O_4$, $MgFe_2O_4$, $ZnFe_2O_4$, $Fe_3O_4$ (and other iron ferrites having a general formula of $MFe_2O_4$, where M is a divalent ion, such as Cu, Li, or Ni).

Suitable multiferroic materials include, but are not limited to, bismuth ferrite, nickel ferrite, cobalt ferrite, lithium ferrite, copper ferrite, manganese ferrite, or yttrium iron garnet. Multiferroic materials also include ferroelectric materials, such as barium titanate, PZT, lead manganese niobate (PMN), lead titanate ($PbTiO_3$ or PTO), strontium bismuth tantalate (SBT), and strontium barium niobate. Further examples of multiferroic materials include $BiFeO_3$, $YMnO_3$, $TbMnO_3$, and $TbMn_2O_5$. Examples of composite multiferroic materials include $PZT/CoZnFe_2O_4$, $PZT/NiZnFe_2O_4$, and $BaTiO_3/CoFe_2O_4$.

The particular geometry of the nanoparticles, in terms of both size and shape, may significantly affect the amount of phase change produced by the present phase shifter. The underlying physics research indicates that a finer nanoparticle suspension (i.e., smaller nanoparticles) will exhibit faster and stronger phase change than a coarser suspension of nanoparticles. Y. Reznikov et al., Ferroelectric Nematic Suspension, Applied Physical Letters, Vol. 82, No. 12, pp. 1917-1919 (2003). In exemplary embodiments of the present invention, the longest axis of the nanoparticles must be substantially smaller than thickness (or longest axis) of the liquid crystal (e.g., by a ratio ranging from 1:10 to 1:100) in order to assure that the nanoparticles are free to rotate in response to the applied electric field, and are not mechanically constrained by contact with the substrate or lid (cover) of the device. In terms of shape, in exemplary embodiments, an increased phase shift is achieved using non-spherical nanoparticles exhibiting shape anisotropy, such as rods, bars, and cones. Furthermore, a further improved amount of phase shift is achieved when the permanent dipole moment and permanent magnetization is aligned with the longer axis of nanoparticles having shape anisotropy.

The liquid crystal material can be twisted nematic (TN), super-twisted nematic (STN), ferroelectric, magnetic, or chiral nematic liquid crystals. Suitable chiral nematic liquid crystals include polymer dispersed liquid crystals (PDLC).

Suitable chiral nematic liquid crystal compositions may have a positive dielectric anisotropy and include chiral material in an amount effective to form focal conic and twisted planar textures. Suitable commercial nematic liquid crystals include, but are not limited to, E7, E44, E48, E31, E80, BL087, BL101, ZLI-3308, ZLI-3273, ZLI-4801, ZLI-4692, ZLI-5048-000, ZLI-5049-100, ZLI-5081, ZLI-5100-100, ZLI-5800-000, MLC-6041-100.TL202, TL203, TL204 and TL205, and MLC-6267, 6284, 6287, 6288, 6406, 6422, 6423, 6425, 6435, 6437, 7700, 7800, 9000, 9100, 9200, 9300, 10000, manufactured by E. MERCK (Darmstadt, Germany). Further examples of chiral nematic liquid crystal materials include MERCK BL112, BL126, BL-03, BL-048 or BL-033, which are available from EM INDUSTRIES (Hawthorne, N.Y.). Other commercially available liquid crystals include LIXON5036XX, 5037XX, 5039XX, 5040XX, 5041XX, JC-1041XX, and the like (manufactured by CHISSO CORPORATION); and cyanobiphenyl-based nematic liquid crystal, 4-cyano-4'-pentylbiphenyl (5CB), manufactured by ALDRICH CHEMICAL COMPANY.

Figure 2:
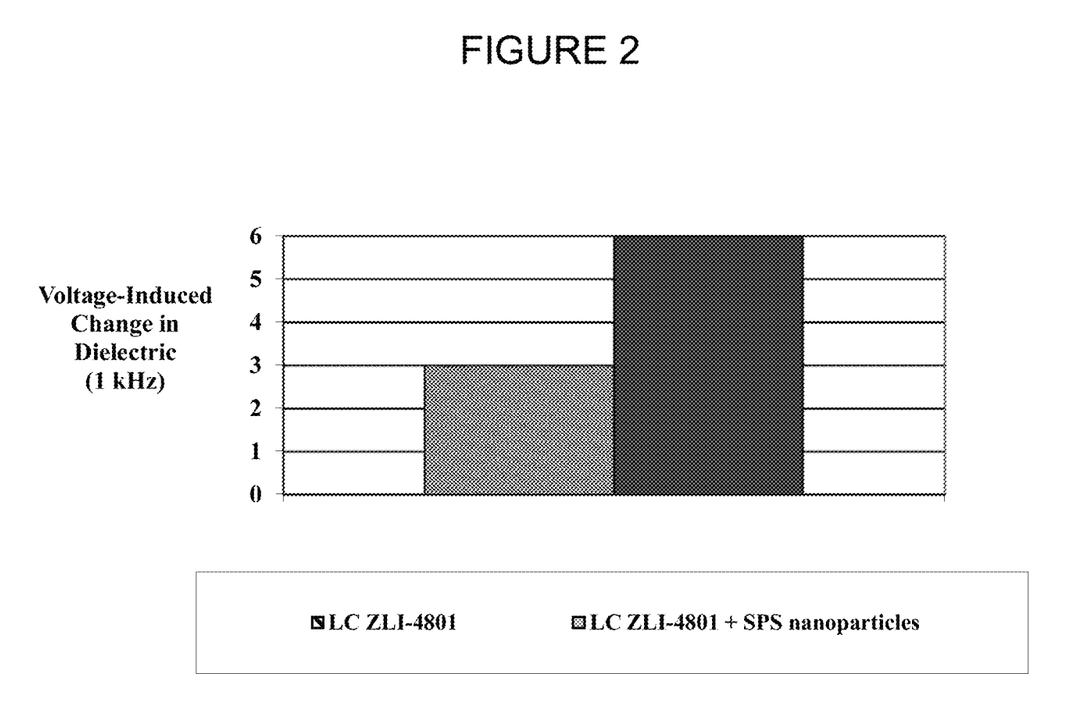
FIG. 2 is a table illustrating the voltage-induced change in dielectric constant of a phase shifter containing liquid crystal and a phase shifter containing SPS nanoparticles in a liquid crystal host.

The combination of a liquid crystal host and nanoparticle with the aforementioned characteristics has a profound effect on the change in dielectric constant as seen by the propagating RF signal. For example, as illustrated in FIG. 2, a conventional liquid phase shifter containing only liquid crystal ZLI-4801 (in liquid crystal layer 1) yields a voltage-induced change in dielectric constant of 3 (as seen by the propagating RF signal) at a frequency of 1 kHz. In contrast, a phase shifter containing SPS nanoparticles in a ZLI-4801 liquid crystal host (in liquid crystal layer 1) yields a change in dielectric constant of 6 (as seen by the propagating RF signal), which is a 100% increase in change in dielectric constant. The velocity change and the phase change vary with the square root of the change in dielectric constant as seen by the propagating RF signal. Accordingly, a 40% improvement in device characteristics was achieved, in comparison to a conventional liquid crystal phase shifter.

Favorable results have also been observed using various types of liquid crystal hosts (including E7 liquid crystals). In an embodiment using BaTiO3 nanoparticles suspended in an E7 liquid crystal host, a change in dielectric constant of 12 (as seen by the propagating RF signal) was observed, whereas a change in dielectric constant of 10 (as seen by the propagating RF signal) was observed for both E7 crystal doped with SPS nanoparticles and E7 liquid crystals alone. The present inventors have discovered exemplary pairings of liquid crystals and nanoparticles. For example, in the case of the pairing of E7 liquid crystals and $BaTiO_3$ nanoparticles, particular matches of liquid crystals and nanoparticles yield improved results. Other exemplary liquid crystal-nanoparticle pairings include, but are not limited to, ZLI-4801 and SPS; 5CB and SPS; TL205 and $BaTiO_3$; TL205 and SPS; TL205 and $LiNbO_3$; TL205 and $PbTiO_3$. Exemplary characteristics for ferroelectric nanoparticles, high dielectric constant nanoparticles, ferromagnetic nanoparticles, ferrimagnetic nanoparticles, and multiferroic nanoparticles are provided in detail below.

Exemplary ferroelectric nanoparticles in the liquid crystal layer have the following characteristics. In this embodiment, the magnitude of the permanent dipole moment for the ferroelectric nanoparticles exceeds the largest expected value of the electric field induced polarization of the liquid crystal host. The size ratio of the liquid crystal molecules to ferroelectric nanoparticles ranges from 1:10 to 1:100. The size ratio is the ratio between the length of the longest axis of the ferroelectric nanoparticles and the length of the longest axis of the liquid crystal molecules. Furthermore, the longest axis of the nanoparticles should be substantially smaller than the minimum dimension of the liquid crystal containment area (e.g., by a degree of at least 10), in order to facilitate rotation of the nanoparticles in response to the applied electric field. Preferably, the concentration of the ferroelectric nanoparticles ranges 0.1% by weight to 1.0% by weight, 0.25% by weight to 0.75% by weight, or from 0.4% by weight to 0.6% by weight.

Suitable ferroelectric nanoparticles have the following additional characteristics or combinations thereof. For example, exemplary ferroelectric nanoparticles are single domain ferroelectrics (as compared to nanoparticles composed of multiple domains with random orientations). Furthermore, in an alternative embodiment, the ferroelectric nanoparticles are coated with surfactant to reduce particle aggregation and sedimentation, thereby keeping the nanoparticles in suspension and contributing to the extended operational lifetime of the phase shifter device. Suitable surfactants include nonionic surfactants. Other exemplary surfactants include, but are not limited to, oleic acid, citric acid, and other nonionic surfactants.

In addition, superior performance is achieved using ferroelectric nanoparticles with shape anisotropy. Although improved performance (i.e., dipole rotation) is observed using ferroelectric nanoparticles having any degree of anisotropy, performance increases in correlation with the degree of shape anisotropy. For example, exemplary ferroelectric nanoparticles have a degree of shape anisotropy ($D_{max}/D_{min}$, where $D_{max}$ is the diameter of the longest axis of the nanoparticles and the $D_{max}$ is the diameter of the short axis of the nanoparticles) of at least 10.

The interaction between the applied electric field and the dipole moment of the nanoparticles causes a torque that rotates the nanoparticles. Because shape anisotropy facilitates mechanical rotation of nanoparticles by the rotation of the liquid crystal molecules, increased shape anisotropy of the nanoparticles results in increased mechanical rotation of the nanoparticles. Accordingly, the rotation of the nanoparticles results in a change in the effective dielectric constant as seen by the propagating RF signal. In turn, the wave velocity of the propagating RF signal changes in correlation with the change in dielectric constant, in accordance with the following equation (relating wave velocity $v$, permeability $\mu$, and permittivity $\in$):

$$v=c/(\mu\in)^{1/2}$$

The strongest dipole rotation occurs when the permanent dipole moment of the ferroelectric nanoparticles is aligned with the longest axis of the nanoparticles.

The ferroelectric nanoparticle-liquid crystal suspension should be free from ionic contamination because ionic contaminants screen the applied electric field from the liquid crystals and the nanoparticles; and ionic contaminants screen desired fields induced by the dipole moment, thereby reducing the effectiveness of the ferroelectric nanoparticles.

In alternative non-limiting embodiments, high dielectric constant materials (or high-K materials) are included in the liquid crystal layer. The present inventors discovered that high dielectric constant materials have dielectric constant values that are within the same range as materials commonly used in microstrip devices and circuits, thereby facilitating the use of high dielectric constant materials in conventional microstrip devices and circuits. The suspension of high dielectric constant nanoparticles increases the effective dielectric constant of the liquid crystal which then allows the use of device dimensions that are more realistic for device applications. The high dielectric constant materials are dielectrics that do not have a permanent dipole moment and thus spheres are not rotated electrically by the applied electric field. As discussed above, the shape anisotropy of the nanoparticles facilitates mechanical rotation of the nanoparticles by the liquid crystal molecules.

Exemplary high-K nanoparticles have a higher dielectric constant relative to the dielectric constant of the liquid crystal host. More specifically, in preferred embodiments of the present disclosure, the dielectric constant $\in$ for the high-K nanoparticles exceeds the highest maximum dielectric constant value of the liquid crystal host. Because liquid crystal materials have dielectric constants that range from 10 (perpendicular) to 30 (parallel) relative to the long axis of the liquid crystal molecule, exemplary high-K nanoparticles should have a dielectric constant $\in$ of at least 30.

The size ratio of the liquid crystal molecules to the high-K nanoparticles ranges from 1:10 to 1:100. This size ratio is based on the longest axis of the high-K nanoparticles compared to the longest axis of the liquid crystal molecules. Furthermore, the longest axis of the nanoparticles should be substantially smaller than the minimum dimension of the liquid crystal containment area (e.g., by a degree of at least 10), in order to facilitate rotation of the nanoparticles in response to the applied electric field. Preferably, the concentration of the high-K nanoparticles ranges 0.1% by weight to 10% by weight, from 0.5% by weight to 5% by weight, or from 0.9% by weight to 1.1% by weight.

In alternative non-limiting embodiments, the above high-K nanoparticles have the following additional characteristics or combinations thereof. For example, in preferred embodiments, high dielectric constant materials are generally single domain high dielectric constant materials. Furthermore, in embodiments using high-K nanoparticles, the nanoparticles are not coated with surfactant because high-K nanoparticles have no permanent dipole moment or (permanent) magnetization that would drive aggregation and sedimentation.

However, similar to other exemplary embodiments discussed above, suitable high-K nanoparticles have shape anisotropy, in order to yield any enhancement of the electric field induced change in the dielectric constant of the liquid crystal. Exemplary high-K nanoparticles have a degree of shape anisotropy ($D_{max}/D_{min}$) of at least 10.

In addition, unlike ferroelectric nanoparticle embodiments, high-K nanoparticles have no permanent dipole moment or permanent magnetization. Therefore, the alignment of the permanent magnetization (or the alignment of the permanent dipole moment) with the longest axis of the nanoparticles is immaterial to the performance of the high-K nanoparticles.

In alternative non-limiting embodiments, ferromagnetic nanoparticles or ferrimagnetic nanoparticles (which have a permanent magnetization), produce a change in both the dielectric constant (as seen by the propagating RF signal) of the ferromagnetic or ferrimagnetic nanoparticles (due to the rotation of the liquid crystal molecules), as well as a change in the permeability (as seen by the propagating RF signal) as the nanoparticles are rotated. As in the case of the high dielectric constant nanoparticles (discussed above), the electric field does not directly rotate the ferromagnetic nanoparticles. Rather, the ferromagnetic nanoparticles (or ferrimagnetic nanoparticles) are rotated mechanically by the electric field induced rotation of the liquid crystal molecules when the nanoparticles have shape anisotropy.

In alternative non-limiting embodiments, the ferromagnetic nanoparticles or the ferrimagnetic nanoparticles have a nonzero permanent magnetization. The size ratio of the liquid crystal molecules to the ferromagnetic or ferrimagnetic nanoparticles ranges from 1:10 to 1:100. This size ratio is based on the longest axis of the ferromagnetic or ferrimagnetic nanoparticles compared to the longest axis of the liquid crystal molecules. Furthermore, the longest axis of the nanoparticles should be substantially smaller than the minimum dimension of the liquid crystal containment area (e.g., by a degree of at least 10), in order to facilitate rotation of the nanoparticles in response to the applied electric field. Preferably, the concentration of the ferromagnetic or ferrimagnetic nanoparticles ranges 0.1% by weight to 1.0% by weight, from 0.25% by weight to 0.75% by weight, or from 0.4% by weight to 0.6% by weight.

Suitable ferromagnetic or ferrimagnetic nanoparticles have the following additional characteristics or combinations thereof. For example, in exemplary embodiments, single domain ferromagnetic or ferrimagnetic nanoparticles provide superior performance over ferromagnetic or ferrimagnetic nanoparticles with multiple, randomly oriented domains. In photorefraction experiments comparing test structures relevant to the present phase shifter devices including single domain ferromagnetic or ferrimagnetic nanoparticles versus test structures relevant to the present phase shifter devices including multi-domain ferromagnetic or ferrimagnetic nanoparticles, the test structures having single domain nanoparticles (at a concentration ten times lower than the test structures having multi-domain nanoparticles) achieve the same performance as the test structures having multi-domain nanoparticles. Furthermore, similar to exemplary embodiments discussed above, ferromagnetic or ferrimagnetic nanoparticles are coated with surfactants to prevent aggregation and sedimentation; exemplary surfactants are provided above.

Ferromagnetic or ferrimagnetic nanoparticles have shape anisotropy, in order to be rotated mechanically by the liquid crystal molecules. Preferred ferromagnetic or ferrimagnetic nanoparticles have a degree of shape anisotropy ($D_{max}/D_{min}$) of at least 10. Furthermore, when using ferromagnetic or ferrimagnetic nanoparticles, it should be noted that the permanent magnetization tends to be aligned along the longest axis of the ferromagnetic or ferrimagnetic nanoparticles.

In alternative non-limiting embodiments, multiferroic nanoparticles are included in the liquid crystal layer. Multiferroic materials are ferroelectric and, thus, have a permanent dipole moment and may also have a net magnetic moment or effective magnetization. Accordingly, multiferroic nanoparticles have the advantage of direct rotation by the applied electric field, and multiferroic nanoparticles alter the wave velocity by changing both the permeability $\mu$ and the dielectric constant $\in$ as seen by the propagating RF signal.

The magnitude of the permanent dipole moment for the multiferroic nanoparticles exceeds the largest expected value of the electric field induced polarization of the liquid crystal host. The size ratio of the liquid crystal molecules to the multiferroic nanoparticles ranges from 1:10 to 1:100. This size ratio is based on the longest axis of the multiferroic nanoparticles compared to the longest axis of the liquid crystal molecules. Furthermore, the longest axis of the nanoparticles should be substantially smaller than the minimum dimension of the liquid crystal containment area (e.g., by a degree of at least 10, in order to facilitate rotation of the nanoparticles in response to the applied electric field. Preferably, the concentration of the multiferroic nanoparticles ranges 0.1% by weight to 1.0% by weight, from 0.25% by weight to 0.75% by weight, or from 0.4% by weight to 0.6% by weight.

The above multiferroic nanoparticles have the following additional characteristics or combinations thereof. For example, single domain multiferroic nanoparticles provide superior performance over multi-domain multiferroic nanoparticles. In photorefraction experiments comparing test structures including single domain multiferroic nanoparticles versus test structures including multi-domain multiferroic nanoparticles, the test structures having single domain nanoparticles (at a concentration ten times lower than the test structures having multi-domain nanoparticles) achieve the same performance as the test structures having multi-domain nanoparticles. In addition, similar to exemplary embodiments discussed above, multiferroic nanoparticles are coated with surfactants to prevent aggregation and sedimentation; exemplary surfactants are provided above.

In addition, improved performance is achieved using multiferroic nanoparticles having shape anisotropy ($D_{max}/D_{min}$) of at least 10. However, shape anisotropy is not required for multiferroic nanoparticles. Because the multiferroic nanoparticles have a permanent dipole moment, the multiferroic nanoparticles rotate themselves, even if the shape of the multiferroic nanoparticles is isotropic. However, if the multiferroic nanoparticles have shape anisotropy, the rotation of the multiferroic nanoparticles also facilitates rotation of the liquid crystal molecules. In addition, it should be noted that superior performance is achieved using multiferroic nanoparticles having a permanent dipole moment aligned along the long axis of the nanoparticles. An applied magnetic field may be applied using multiferroic nanoparticles; the multiferroic nanoparticles will align in response to the applied magnetic field.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A liquid crystal phase shifter comprising:
   at least one electrode attached to a first substrate layer;
   a ground plane layer attached to a second substrate layer; and
   a liquid crystal layer positioned between the ground plane layer and the first substrate layer,
   wherein the liquid crystal layer comprises a suspension of a liquid crystal material and highly polarizable nanoparticles having a permanent dipole moment value greater than a maximum value of an electric field induced polarization of the liquid crystal material.

2. The liquid crystal phase shifter according to claim 1, wherein the highly polarizable nanoparticles are ferroelectric nanoparticles comprising at least one of perovskites, tungsten bronzes, bismuth oxide layered materials, pyrochlores, alums, Rochelle salts, dihydrogen phosphates, dihydrogen arsenates, guanidine aluminum sulfate hexahydrate, triglycine sulfate, tin hypothiodiphosphate ($Sn_2P_2S_6$ or SPS), colemanite, thiourea, titanates and tantalates.

3. The liquid crystal phase shifter according to claim 2, wherein the ferroelectric nanoparticles comprise perovskites, and wherein the perovskites include at least one of barium strontium titanate (BST), barium titanate ($BaTiO_3$ or BT), $P_b(Co_{0.25}Mn_{0.25}W_{0.5})O_3$, barium titanate and lead titanate doped with niobium oxide, antimony oxide, lithium niobate ($LiNbO_3$), lithium tantalate ($LiTaO_3$), and lanthanum oxide.

4. The liquid crystal phase shifter according to claim 2, wherein the ferroelectric nanoparticles comprise titanates and tantalates, and wherein the titanates and tantalates include at least one of lead lanthanum zirconium titanate (PLZT), strontium bismuth tantalate (SET), lead zirconium titanate, and strontium bismuth tantalate (SBT).

5. The liquid crystal phase shifter according to claim 1, wherein a size ratio of a length of a longest axis of the highly polarizable nanoparticles to a length of a longest axis of the liquid crystal material ranges from 1:10 to 1:100.

6. The liquid crystal phase shifter according to claim 5, wherein a ratio of a length of the longest axis of the highly polarizable nanoparticles to a length of a shortest axis of the nanoparticles is at least 10.

7. The liquid crystal phase shifter according to claim 1, wherein the liquid crystal material is selected from the group consisting of twisted nematic liquid crystals, super-twisted nematic liquid crystals, ferroelectric liquid crystals, magnetic liquid crystals, and chiral nematic liquid crystals, individually or in combination.

8. The liquid crystal phase shifter according to claim 7, wherein the liquid crystal material comprises at least one of a nematic, cholesteric, smectic, ferroelectric, and blue phase liquid crystal mixtures.

9. The liquid crystal phase shifter according to claim 1, wherein the suspension has a concentration of the highly polarizable nanoparticles ranging from 0.1% by weight to 1.0% by weight.

10. The liquid crystal phase shifter according to claim 1, wherein the highly polarizable nanoparticles comprise a surfactant coating.

11. The liquid crystal phase shifter according to claim 1, the liquid crystal layer comprising a combination of at least one nematic, cholesteric, smectic, ferroelectric, and/or blue phase liquid crystal mixtures with at least one of tin hypothiodiphosphate; lithium niobate; and lead titanate.

12. A liquid crystal phase shifter comprising:
at least one electrode attached to a first substrate layer;
a ground plane layer attached to a second substrate layer; and
a liquid crystal layer positioned between the ground plane layer and the first substrate layer,
wherein the liquid crystal layer comprises a suspension of a liquid crystal material and nanoparticles having a dielectric constant greater than the maximum dielectric constant of the liquid crystal material.

13. The liquid crystal phase shifter according to claim 12, wherein a size ratio of a length of a longest axis of the nanoparticles to a length of a longest axis of the liquid crystal material ranges from 1:10 to 1:100.

14. The liquid crystal phase shifter according to claim 13, wherein a ratio of a length of the longest axis of the nanoparticles to a length of a shortest axis of the nanoparticles is at least 10.

15. The liquid crystal phase shifter according to claim 12, wherein the liquid crystal material is selected from the group consisting of twisted nematic liquid crystals, super-twisted nematic liquid crystals, ferroelectric liquid crystals, magnetic liquid crystals, and chiral nematic liquid crystals.

16. The liquid crystal phase shifter according to claim 15, wherein the liquid crystal material comprises at least one of a nematic, cholesteric, smectic, ferroelectric, and blue phase liquid crystal mixtures.

17. The liquid crystal phase shifter according to claim 12, wherein the suspension has a concentration of the nanoparticles ranging from 0.1% by weight to 10.0% by weight.

18. The liquid crystal phase shifter according to claim 12, wherein the nanoparticles comprise at least one of bismuth strontium titanate (BST), barium titanate (BT), strontium titanate (ST), lead zirconium titanate (PZT), magnesium and calcium titanates ($Mg_2TiO_4$, $MgTiO_3$ and $CaTiO_3$) and their composites, hafnium silicate, zirconium silicate, hafnium dioxide, tantalum dioxide, tantalum pentoxide, aluminum oxide, and zirconium dioxide.

19. A liquid crystal phase shifter comprising:
at least one electrode attached to a first substrate layer;
a ground plane layer attached to a second substrate layer; and
a liquid crystal layer positioned between the ground plane layer and the first substrate layer,
wherein the liquid crystal layer comprises a suspension of a liquid crystal material and ferromagnetic or ferrimagnetic nanoparticles having a nonzero permanent magnetization.

20. The liquid crystal phase shifter according to claim 19, wherein a size ratio of a length of a longest axis of the nanoparticles to a length of a longest axis of the liquid crystal material ranges from 1:10 to 1:100.

21. The liquid crystal phase shifter according to claim 20, wherein a ratio of a length of the longest axis of the nanoparticles to a length of a shortest axis of the nanoparticles is at least 10.

22. The liquid crystal phase shifter according to claim 19, wherein the liquid crystal material is selected from the group consisting of twisted nematic liquid crystals, super-twisted nematic liquid crystals, ferroelectric liquid crystals, magnetic liquid crystals, and chiral nematic liquid crystals, individually or in combination.

23. The liquid crystal phase shifter according to claim 22, wherein the liquid crystal material comprises at least one of a nematic, cholesteric, smectic, ferroelectric, and blue phase liquid crystal mixtures.

24. The liquid crystal phase shifter according to claim 19, wherein the suspension has a concentration of the ferromagnetic nanoparticles or the ferrimagnetic nanoparticles ranging from 0.1% by weight to 1.0% by weight.

25. The liquid crystal phase shifter according to claim 19, wherein the ferromagnetic nanoparticles or the ferrimagnetic nanoparticles comprise a surfactant coating.

26. The liquid crystal phase shifter according to claim 19, wherein the ferromagnetic or ferrimagnetic nanoparticles comprise at least one of cobalt, nickel, gadolinium, gallium manganese arsenide, iron, iron-containing magnetic metal oxides, a mixed metal oxide of the type $M1_x$-$M2_yO_4$, wherein M1 represents a divalent metal ion and M2 represents a trivalent metal ion, hexagonal ferrites, rare earth transition metals, ferrites, garnets, gadolinium, terbium, dysprosium with at least one of Fe and Co, iron ferrites having a general formula of $MFe_2O_4$, where M is a divalent ion.

27. A liquid crystal phase shifter comprising:
at least one electrode attached to a first substrate layer;
a ground plane layer attached to a second substrate layer; and
a liquid crystal layer positioned between the ground plane layer and the first substrate layer,
wherein the liquid crystal layer comprises a suspension of a liquid crystal material and multiferroic nanoparticles having a permanent dipole moment value greater than a maximum value of an electric field induced polarization of the liquid crystal material.

28. The liquid crystal phase shifter according to claim 27, wherein a size ratio of a length of a longest axis of the multiferroic nanoparticles to a length of a longest axis of the liquid crystal material ranges from 1:10 to 1:100.

29. The liquid crystal phase shifter according to claim 28, wherein a ratio of a length of the longest axis of the multiferroic nanoparticles to a length of a shortest axis of the nanoparticles is at least 10.

30. The liquid crystal phase shifter according to claim 27, wherein the liquid crystal material is selected from the group consisting of twisted nematic liquid crystals, super-twisted nematic liquid crystals, ferroelectric liquid crystals, magnetic liquid crystals, and chiral nematic liquid crystals, individually or in combination.

31. The liquid crystal phase shifter according to claim 30, wherein the liquid crystal material comprises at least one of a nematic, cholesteric, smectic, ferroelectric, and blue phase liquid crystal mixtures.

32. The liquid crystal phase shifter according to claim 27, wherein the suspension has a concentration of the multiferroic nanoparticles ranging from 0.1% by weight to 1.0% by weight.

33. The liquid crystal phase shifter according to claim 27, wherein the multiferroic nanoparticles comprise a surfactant coating.

34. The liquid crystal phase shifter according to claim 27, wherein the multiferroic nanoparticles comprise at least one of bismuth ferrite, nickel ferrite, cobalt ferrite, lithium ferrite, copper ferrite, manganese ferrite, yttrium iron garnet, barium titanate, PZT, lead manganese niobate (PMN), lead titanate ($PbTiO_3$ or PTO), strontium bismuth tantalate (SBT), strontium barium niobate, $BiFeO_3$, $YMnO_3$, $TbMnO_3$, $TbMn_2O_5$, $PZT/CoZnFe_2O_4$, $PZT/NiZnFe_2O_4$, and $BaTiO_3/CoFe_2O_4$.

35. The liquid crystal phase shifter according to claim 27, the liquid crystal layer comprising the combination of a nematic, cholesteric, smectic, ferroelectric, and blue phase liquid crystal mixtures and nanoparticle lead titanate.

* * * * *